Feb. 20, 1940.  I. F. SMITH  2,190,953
JACK
Filed Dec. 14, 1938  3 Sheets-Sheet 1
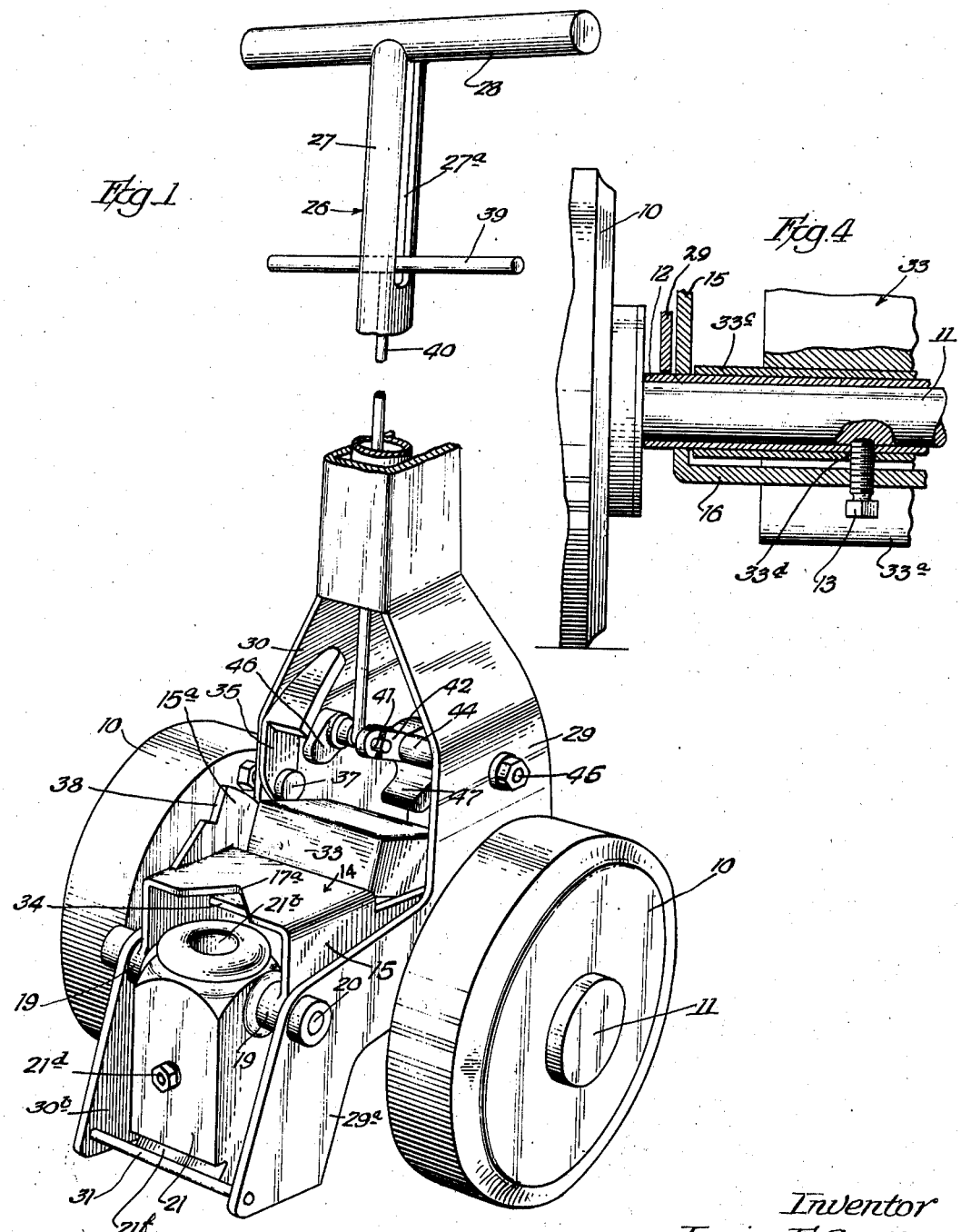
Inventor
Irwin F. Smith
By Sheridan, Davis & Cargill
Attys.

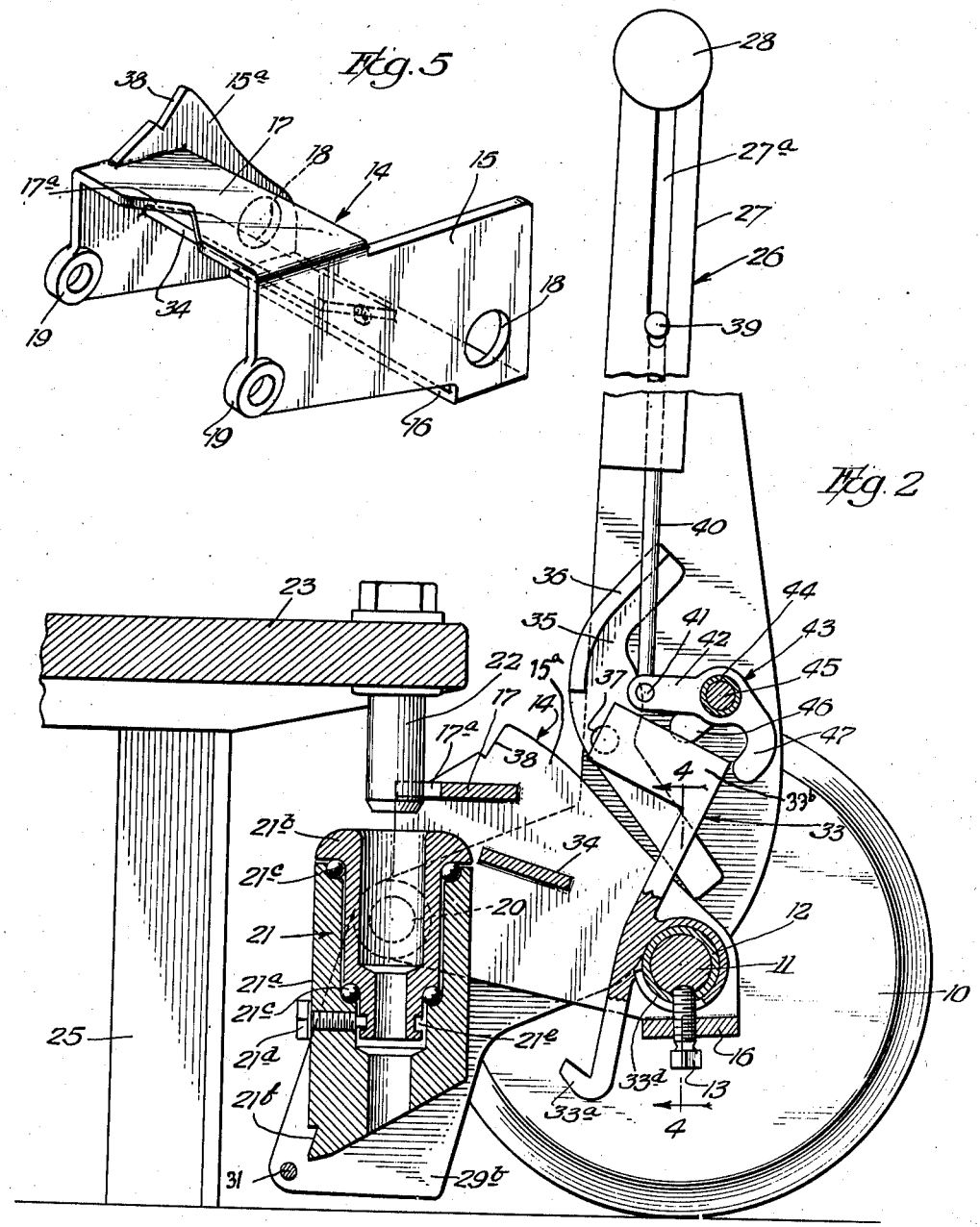

Feb. 20, 1940.      I. F. SMITH      2,190,953
JACK
Filed Dec. 14, 1938      3 Sheets-Sheet 3
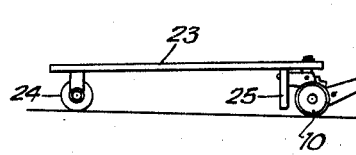
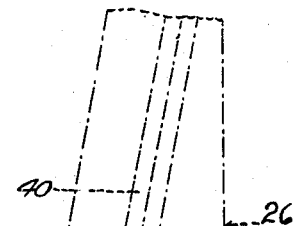
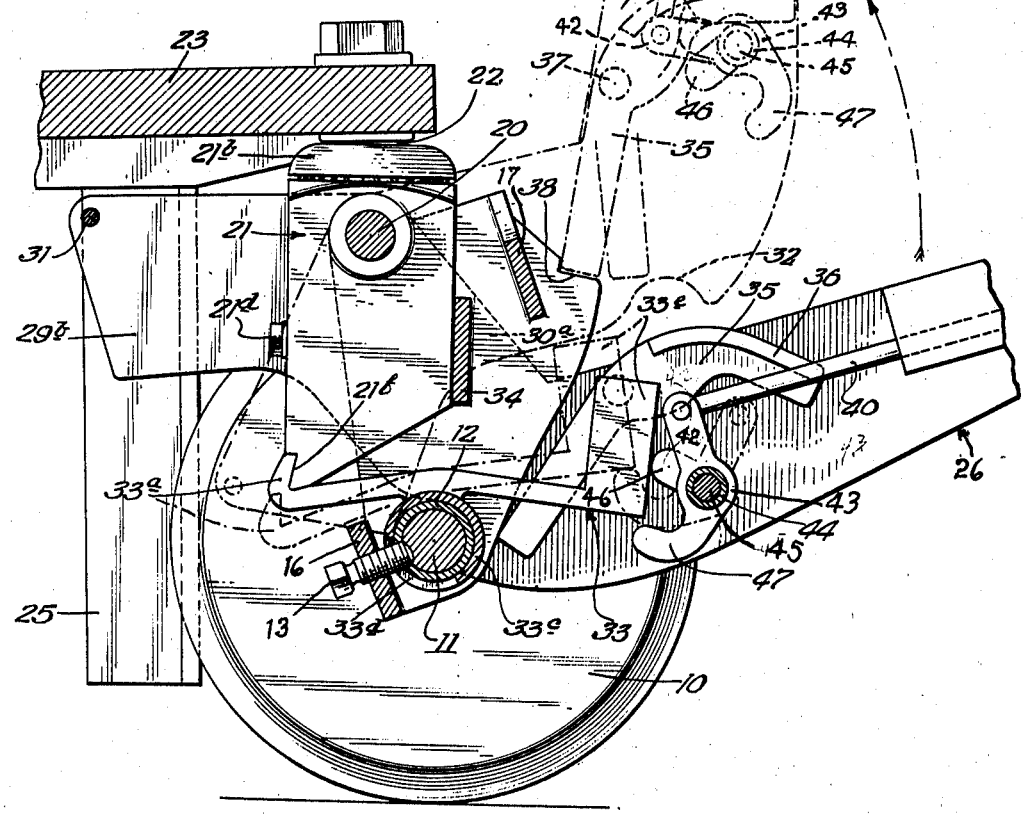
Inventor
Irwin F. Smith
BY
Sheridan, Davis & Cargill
Attys.

Patented Feb. 20, 1940

2,190,953

UNITED STATES PATENT OFFICE 2,190,953

JACK

Irwin F. Smith, Faribault, Minn., assignor to Nutting Truck Company, Faribault, Minn., a corporation of Minnesota Application December 14, 1938, Serial No. 245,550

11 Claims. (Cl. 280—46)

This invention relates to improvements in jacks for use with trucks of the type having a load carrying body or platform and a pair of rear wheels, the front end of the body being supported by a jack when the truck is in use in transporting a load but generally by a pair of front legs when the truck is not being so used. Such trucks generally are provided with a draft member in the form of a depending stud or pin with which the jack is engageable in elevating and hauling the load.

One object of the invention is to provide a jack of the type mentioned having means operable to truck engaging and supporting position by simple movement of the jack tongue in one direction and means whereby upon the accompanying elevation of the forward end of the truck a predetermined distance, the load elevating means of the jack is automatically locked in position whereupon the jack tongue can be moved freely between upper and lower limits in hauling and guiding the truck.

Another object of the invention is to provide a jack for the purposes mentioned comprising preferably a pair of wheels and a rockable load elevating and supporting frame mounted on the axle of the wheels and which can be operated to load elevating position by a tongue which, during such raising operation or in lowering the load, fulcrums about the axle of the wheels as a lever.

Another object of the invention is to provide a jack having a tongue which not only constitutes a lever for effecting engagement of the jack with the truck and the elevation of the latter but which, after such elevation, is freely swingable throughout an adequate range in a vertical plane during transportation of the truck and may, when desired, be swung to substantially an upright or out-of-the-way position and automatically latched therein.

Other objects relate to various features of the invention which will be more apparent from a consideration of the accompanying drawings, wherein:

Fig. 1 is a broken perspective view of a jack embodying the present improvements;

Fig. 2 is a sectional side elevation of the jack in a position for engaging a truck or in the position immediately following the lowering of the truck and disengagement of the jack;

Fig. 3 is a side elevation partially in section showing the jack in truck or load supporting position;

Fig. 4 is a broken sectional view taken on line 4—4 of Fig. 2;

Fig. 5 is a detached perspective view of the load supporting rockable frame member; and Fig. 6 is a side elevation of a conventional truck shown in a position for transportation by means of one of the improved jacks.

The embodiment of the invention shown in the drawings comprises a pair of wheels 10 mounted on an axle 11 and between which wheels 10 the mechanism of the jack is disposed. For retaining the wheels against inward movement on the axle 11, the latter is shown as being provided with a spacing sleeve 12, the ends of which, as shown in Fig. 4, prevent inward movement of the wheels along the axle. The sleeve 12 is attached to the axle 11 as by a set screw 13.

A rockable frame or load carrying means indicated generally by the numeral 14 is carried by the axle 11, said member comprising side plates 15 and 15a held in spaced relation by transverse webs 16 and 17 which may be welded thereto. The web 16 threadedly receives the set screw 13 which thereby locks the assembly to the axle. The members 15 and 15a are provided with aligned apertures 18 which accommodate the axle 11 and the sleeve 12. The side plates 15 and 15a extend rearwardly of the axle 11 and at their rear portions are provided with apertured bosses 19 which constitute bearings for pivotal studs 20 which extend through the apertures of the bosses into recesses provided in the adjacent side walls of a member 21, which member constitutes the engaging means for the depending pin or stud 22 or like draft member carried by the forward end of the platform 23 of the truck. The conventional truck as shown in Fig. 6 is provided with a pair of rear wheels 24, and front legs 25 which support the forward end of the truck when the same is not in engagement with the jack.

The member 21 hangs pendent between the two supporting pins or studs 20. The form of the member 21 shown in the drawings comprises an outer body 21a and an inner bearing or socket member 21b which is freely rotatable within the body 21a by reason of the balls 21c, whereby the jack may be relatively easily guided. The member 21b is shown as being retained in assembled relation by means of a set screw 21d, the inner end of which is seated within an annular groove 21e in the lower end of the member 21b. The lower end of the member 21 is formed at an angle or truncated while the lower edge of the rear face thereof is provided with a latch engaging groove 21f.

A tongue indicated generally by the numeral 26 is provided, the handle portion of which may comprise a tube 27 and a cross piece or handle 28 while the lower portion is fabricated of side plates 29 and 30 suitably welded to the lower portion of the tube 27. The plates 29 and 30 are provided with offset intermediate sections 29a and 30a, respectively, which terminate in lower end portions 29b and 30b, respectively, the latter of which may be held in spaced relation by a rod 31 welded thereto. The tongue is pivotally attached to the member 14 on an axis disposed rearwardly of the axle 11, such as by means of the studs 20 as shown in the drawings. The lower edges of the offset portions 29a—30a of the tongue members 29 and 30, respectively, are provided with arcuate recesses 32 conforming to the curvature of the sleeve 12. The tongue constitutes a lever of the first class, in the embodiment disclosed, which fulcrums about the axle in rocking the member 14 and the member 21 from the position shown in Fig. 2 to the load sustaining position shown in Fig. 3.

It will be seen that by moving the free end of the tongue upwardly, the load carrying member 14 will be rocked to the left or counterclockwise as viewed in Fig. 2, the tongue pivoting or turning about the axis of the axle. When the jack is in the position shown in Fig. 2, that is, with the lower ends of the portions 29b—30b off the floor, the jack may be wheeled or pushed into the position wherein the tubular engaging member 21 is in vertical alignment with the pin or draft member 22 of the truck. The web 17 of the member 14 is preferably provided with a V-shaped notch 17a as shown in Figs. 2 and 5 which acts as a stop operating against the stud 22 to assist in aligning the tubular member 21 with said stud.

When in the position shown in Fig. 2, the tongue may be moved to the right or clockwise, the tongue turning about the axle as a fulcrum. Such movement rocks the member 14 clockwise and raises the member 21 into engagement with the stud 22. Continued downward movement of the tongue will, due to the engagement of the member 21 with the stud 22, cause the jack to move slightly to the left as the truck is elevated, the elevated position being shown in Fig. 3, wherein it will be observed that the legs 25 of the truck are off the floor and that the pivoted members 20 have moved into proximity to a vertical plane through the axis of the axle 11. The load is thus supported nearly above the axle although slightly to the rear thereof. When elevated to the position shown in Fig. 3, retrograde movement of the member 14 under the thrust of the load is prevented by means of a latch indicated generally by the numeral 33.

The member 33 is provided at its rear edge with a catch 33a which is engageable within the notch 21f of the member 21 while the opposite or forward end of the latch is provided with a counter-weight 33b, which tends to tilt the latch clockwise as viewed in Figs. 2 and 3. The member 33 is provided with a tubular mounting portion 33c which surrounds the tube 12, said portion 33c being provided with a slot 33d therein through which the set screw 13 extends. The ends of the slot constitute stops for limiting the tilting movement of the latch member. When the jack is in the position shown in Fig. 2, the center of gravity of the counter-weight 33b is disposed to the rear of the axle and hence the latch tends to remain in the position shown.

As the member 14 is moved clockwise by the tongue from the position of Fig. 2, the bar or web 16 swings the latch clockwise until the counter-weight is moved to a position forwardly of the axle whereupon the latch turns clockwise with the member 14 due to the counter-weighted forward end of the latch member. As the member 14 moves from the position shown in Fig. 2 toward the position shown in Fig. 3, the rear end 33a of the latch is guided by the inclined lower end of the member 21 into a position for automatically engaging within the notch 21b of the member 21 as above mentioned. When the member 21 reaches the position shown in Fig. 3, it abuts a transverse stop 34 which may be in the form of a plate extending between the side walls 15—15a of the member 14 and welded thereto.

Notwithstanding that member 14 is rockable about the axis of the axle 11, the distance from the axis of the axle 11 to the point of engagement of the member 33a is less than the distance from the axle to the pivot pins 20, and the member 14 therefore is held in elevated or load-sustaining position by the latch member. Since in the elevated position, the axis of the pins 20 is nearly vertically disposed over the axle 11, the thrust imposed on the catch 33 by the load is not excessive. When the catch 33 is in the full line position shown in Fig. 3, the load imposed upon the jack by the forward end of the truck is carried by the members 14 and 21 independently of the tongue. The tongue may, therefore, after the jack has been latched in load-sustaining position, be swung freely about the axis of the pivots 20 as suits the convenience of the operator in hauling the loaded truck. When the loaded truck has been hauled to its destination, the jack may readily be disengaged from the truck for lowering the forward end of the latter or, if desired, the tongue may be raised to substantially vertical position where it is out of the way. In Fig. 3, this last mentioned position is indicated by broken lines.

Means for latching the tongue in such elevated position comprises a catch member 35 counter-weighted at its upper end, as at 36, and pivoted at 37 to the tongue member 30. The lower end of the catch 35 is shown in Fig. 3 in engagement with a notch or seat 38 formed in the side plate 15a of the member 14. As the handle is moved to such elevated broken line position, the lower end of the catch 35 moves into engagement with the notch 38 by means of the overhanging counter-weighted end 36 of the catch. To release the catch 35 for the purpose of enabling the tongue to be lowered, the operator lifts upwardly on a transverse handle member 39 operable in a slot 27a in the member 27 and to which is connected a gravity operable rod 40 disposed within the tubular member 27.

The lower end of the rod 40 is pivotally attached at 41 to an arm 42 of a member 43 carried by a sleeve 44 which is mounted on a spacing stud 45 extending between the tongue members 29 and 30. Secured to the sleeve 44 is a cam arm 46 which engages the upper portion of the catch 35 as the rod 40 is raised and swings the catch 35 counterclockwise about its pivot 37 from the lower dotted line position to the upper dotted line position shown in Fig. 3, thus swinging the lower end of the catch out of engagement with the notch 38 and enabling the tongue to be lowered.

When it is desired to disengage the jack from the truck, that is, to move the parts thereof from the positions shown in Fig. 3 to the position shown in Fig. 2, the tongue is lowered to or slightly beyond the position shown in full lines in Fig. 3 whereby the load of the truck is transferred to the tongue and the latch 33 is relieved. When in such position, the handle 39 is pulled upwardly or outwardly toward the handle 28 to rock the sleeve 44 which also carries an arcuate member 47 which engages the lower forward end of the catch 33 and tilts it upwardly to the dotted line position shown in said figure. The rear end 33a of the latch is thus moved out of the position of engagement with the member 21, and by raising the forward end of the tongue, the latter fulcruming about the shaft or axle 11, the members 14 and 21 can be returned to the position shown in Figs. 1 and 2. The jack then may be moved outwardly from the truck. A distinct advantage results from the fact that in order to effect the release of the latch 33 by the member 44, the tongue of the jack must be in fulcruming position on the axle and must have assumed the load, since with the tongue in an elevated position operation of the member 47 by the member 40 is ineffective to release the latch member 37 from engagement with member 21. By reason of such arrangement, the weight of a load cannot be transferred suddenly to the tongue which might jerk the upper end of the tongue out of the hands of the operator or might cause injury to him or damage to the jack or to the material on the truck through loss of control of the jack in lowering the truck.

By the present improvements, a relatively simple compact jack is provided that enables the tongue to be utilized as a lever which fulcrums about the axle in moving the load carrying member 14 to the elevated position shown in Fig. 3 whereupon the tongue is relieved from the load and is freely swingable about the axis of the pivot pins 20 during the hauling operation. The catch member 35 automatically engages the notch 38 for holding the tongue in upright or out-of-the-way position as shown in broken lines in Fig. 3 but is readily releasable by means of the manually operable rod 40, which rod also operates the member 47 for releasing the latch 33 when it is desired to lower the truck and effect disengagement of the jack therefrom. When a truck has been elevated by the jack as above described preparatory to hauling and the parts of the jack are in the full line position of Fig. 3, the elevation of the forward end of the tongue does not cause the trip lever 47 to engage the member 33 for the reason that the tongue swings about the axis of the studs 20. During swinging movement of the tongue in hauling the load or in moving the tongue to the elevated position shown in dotted lines in Fig. 3, it pivots about the pins 20. It is only when the tongue is used as a lever for raising or lowering a truck, or for moving the load elevating means to the position shown in Figs. 1 and 2 that the tongue pivots about the axle. Hence in hauling a load, the tongue can be swung freely about the pins 20 from the elevated position of Fig. 3 down to the full-line position of said tongue, as the operator may desire, without shifting the load to the tongue.

While I have shown and described an embodiment of my improvements for the purpose of illustration, it will be apparent that various changes may be made in the same without departing from the spirit of the invention.

What I claim as new and desire to cover by Letters Patent is:

1. A truck jack comprising a pair of wheels provided with an axle, rockable truck engaging and elevating means pivotally mounted on said axle, a tongue pivotally attached to said means on an axis located rearwardly of said axle and adapted to be moved into pivotal relation with the latter for rocking said truck engaging and elevating means to and from operative position, and means comprising a freely swingable latch member for engaging said last named means for retaining the same in said operative position.

2. A truck jack comprising a pair of wheels provided with an axle, rockable truck engaging and elevating means pivotally mounted on said axle, a tongue pivotally attached to said means on an axis located rearwardly of said axle and adapted to be moved into pivotal relation with the latter for rocking said truck engaging and elevating means to and from operative position, and gravity operable means for engaging said last named means for retaining the same in said operative position.

3. A truck jack comprising a pair of wheels provided with an axle, rockable truck engaging and elevating means pivotally mounted on said axle, a tongue pivotally attached to said means on an axis located rearwardly of said axle and adapted to be moved into pivotal relation with the latter for rocking said truck engaging and elevating means to and from operative position, and manually releasable gravity operable means for engaging said last named means for retaining the same in said operative position.

4. A jack of the class described comprising a pair of wheels provided with an axle, a rockable load carrying member pivotally mounted on the axle and provided with a portion extending rearwardly thereof and provided with means for engaging a truck draft member and swingable by said portion from elevated load carrying position to a lower load depositing position and vice versa, a tongue pivotally secured to said carrying member on an axis rearwardly of said axle and extending over and forwardly of the latter and arranged to fulcrum about said axle as a first class lever for rocking said carrying member from load depositing to load carrying positions, a latch adapted to engage a portion of said carrying member when in said load carrying position for retaining the same in said position, and means comprising a manually operable member carried by said tongue for releasing said latch.

5. A jack for use with trucks provided with rear wheels and forward depending draft members comprising a pair of wheels provided with an axle, a rockable frame pivotally mounted on said axle and provided with means pivotally supported thereby eccentrically of the axle for engaging a draft member of a truck, a tongue pivotally attached to said frame rearwardly of the axle and arranged to fulcrum on the axle and rock said frame to cause said engaging means to engage said draft member and elevate the forward end of the truck, a latch member pivotally carried by said axle for engaging said means while the latter is in said elevated position for preventing retrograde movement of said member and frame from load sustaining position independently of said tongue, and means operable only when said tongue is in fulcruming position on said axle for releasing said latch.

6. A jack of the class described comprising a pair of wheels provided with an axle, a rockable load carrying member pivotally mounted on said axle and provided with a portion projecting rearwardly thereof, engaging means for a truck draft member pivotally supported by said portion and swingable thereby from a lower position to an upper position for engaging and elevating the adjacent end of a truck, a tongue provided with spaced lower end members pivotally secured to opposed sides of said portion on an axis located rearwardly of the axle and extending above and forwardly of said axle and adapted for support on and to swing about the axle as a fulcrum as the tongue is lowered for swinging said rockable member to elevated position, a latch pivotally mounted on said axle and arranged for gravity operation into a position of engagement with said engaging means for retaining the latter and said rockable member in elevated load sustaining position, and manually operable means carried by said tongue for moving said latch from said engaging position for releasing said engaging means and said rockable member for movement to said lower position.

7. A wheeled jack of the class described provided with an axle, a rockable load carrying member pivotally mounted on said axle and provided with a portion extending rearwardly thereof and provided with engaging means swingable by said portion upwardly to an elevated position for telescopically engaging a draft member on a truck and raising the adjacent end of the latter, a tongue pivotally attached to said load carrying member on an axis located rearwardly of the axle and extending forwardly over and beyond said axle and arranged to fulcrum on said axle for rocking said load carrying member to load elevating position, and a gravity operated latch pivotally mounted on the axle and arranged to latch said engaging means automatically in said elevated position to sustain said load carrying member in said elevated position independently of said tongue.

8. A wheeled jack of the class described provided with an axle, a rockable load carrying member pivotally mounted on said axle and provided with a portion extending rearwardly thereof and provided with engaging means swingable by said portion upwardly from a lower position to an elevated position for telescopically engaging a draft member on a truck and raising the adjacent end of the latter, a tongue pivotally attached to said load carrying member on an axis located rearwardly of the axle and extending forwardly over and beyond said axle and arranged to fulcrum on said axle for rocking said load carrying member to load elevating position, a gravity operated latch pivotally mounted on the axle and arranged to latch said engaging means automatically in said elevated position to sustain said load carrying member in said elevated position independently of said tongue, and manually operable means carried by said tongue for releasing said latch.

9. A jack for use with a truck provided with a draft member comprising a pair of wheels provided with an axle, a rockable load carrying frame supported by said axle, means pivotally carried by the frame for engaging the draft member of a truck, a tongue for the jack pivotally attached to the frame eccentrically of the axle and constituting a lever arranged to fulcrum about said axle in rocking said frame in one direction into position for engagement with said draft member and to fulcrum in the opposite direction to a position wherein said means engages said draft member and elevates the engaged end of the truck, means operable automatically for locking said frame in said elevated load sustaining position whereby said tongue is manipulatable about the pivotal axis thereof independently of the frame in hauling and guiding the truck, and means effective only when said tongue is in said second mentioned position for releasing said frame to enable the load to be lowered.

10. A jack for elevating an end portion of a truck comprising a pair of wheels provided with an axle, truck elevating means rockably carried by said axle, a tongue pivotally secured to said elevating means rearwardly of the axle and extending above and forwardly of the latter and arranged to fulcrum about the latter as the forward portion of the tongue is lowered to a predetermined position for raising said elevating member to a given position, a latch movable automatically into engagement with said elevating means as the latter reaches said given position for sustaining the load independently of said tongue, a catch carried by said tongue for engaging a portion of the raised elevating member for retaining the tongue in an inoperative upright position, and a manually operable member carried by the tongue for actuating said catch to release said tongue from said inoperative position.

11. A jack of the class described comprising a pair of wheels provided with an axle, load elevating mechanism rockably suported on said axle, a tongue pivotally secured to said mechanism for rocking the same to and from load elevated position, locking means automatically engageable with said mechanism when in the elevated position for retaining said mechanism in said position independently of said tongue and to render the latter freely manipulable about the pivotal axis thereof between an upper position and a lowermost position, a latch automatically operable for releasably retaining said tongue in said upper position, and mechanism comprising a member carried by said tongue and operable manually to release said latch to enable the tongue to be lowered from said upper position and operable also when said tongue is in said lowermost position for releasing said locking means to enable said load elevating mechanism to be lowered by said tongue.

IRWIN F. SMITH.